United States Patent [19]

Flisch

[11] 4,224,845
[45] Sep. 30, 1980

[54] APPARATUS FOR AUTOMATICALLY OPENING AND CLOSING A BAR STOCKGUIDE TUBE FOR A MULTISPINDLE AUTOMATIC LATHE

[75] Inventor: Hermann Flisch, Maienfeld, Switzerland

[73] Assignee: Eunipp AG, Zug, Switzerland

[21] Appl. No.: 16,816

[22] Filed: Mar. 2, 1979

[30] Foreign Application Priority Data

Mar. 13, 1978 [DE] Fed. Rep. of Germany ....... 2810852

[51] Int. Cl.³ .............................................. B23B 13/04
[52] U.S. Cl. ...................................... 82/2.7; 198/653; 221/234
[58] Field of Search ................... 82/2.7; 198/653, 481; 221/234, 81, 87, 88; 414/14, 16

[56] References Cited

U.S. PATENT DOCUMENTS

| 3,131,587 | 5/1964 | Spohn et al. ............................. 82/2.7 |
| 3,627,146 | 12/1971 | Berndt ................................. 198/653 |

FOREIGN PATENT DOCUMENTS

| 924883 | 4/1973 | Canada ...................................... 82/2.7 |
| 818009 | 8/1959 | United Kingdom ....................... 82/2.7 |
| 1345335 | 1/1974 | United Kingdom ....................... 82/2.7 |
| 1440385 | 6/1976 | United Kingdom ....................... 82/2.7 |

Primary Examiner—Leonidas Vlachos

[57] ABSTRACT

The disclosed apparatus features a plurality of identical guide tubes which are mutually parallel and mounted on a loading drum which rotates with a spindle drum of the lathe into a loading position for the guide tubes. Each tube consists of a feed channel and a cover which is hinged so that it can cover the open longitudinal section of the feed channel. The outer surface of the cover has a number of gear segments molded into it at longitudinally spaced locations, and these mesh with a corresponding number of pinion gears on an actuating shaft fixed to the loading drum. A spring biases the shaft axially to force locking extensions on the pinion gears into receiving recesses in the bearing supports for the shaft for locking the cover in the closed position. The loading position for a tube aligns it with the cylindrical coupling member of a drive mechanism. The coupling member is forced forward by a hydraulic piston-cylinder unit and simultaneously rotated by the action of a cam groove in its outer surface which is engaged by a follower pin fixed to the bearing support for the coupling member. A receiving opening in the end of the coupling member receives a splined stub on the end of the shaft. The shaft is first pushed axially to unlock it from its bearing supports and then rotated to open the cover. The closing of the cover proceeds in the reverse order when the hydraulic piston-cylinder unit is reversed.

7 Claims, 9 Drawing Figures

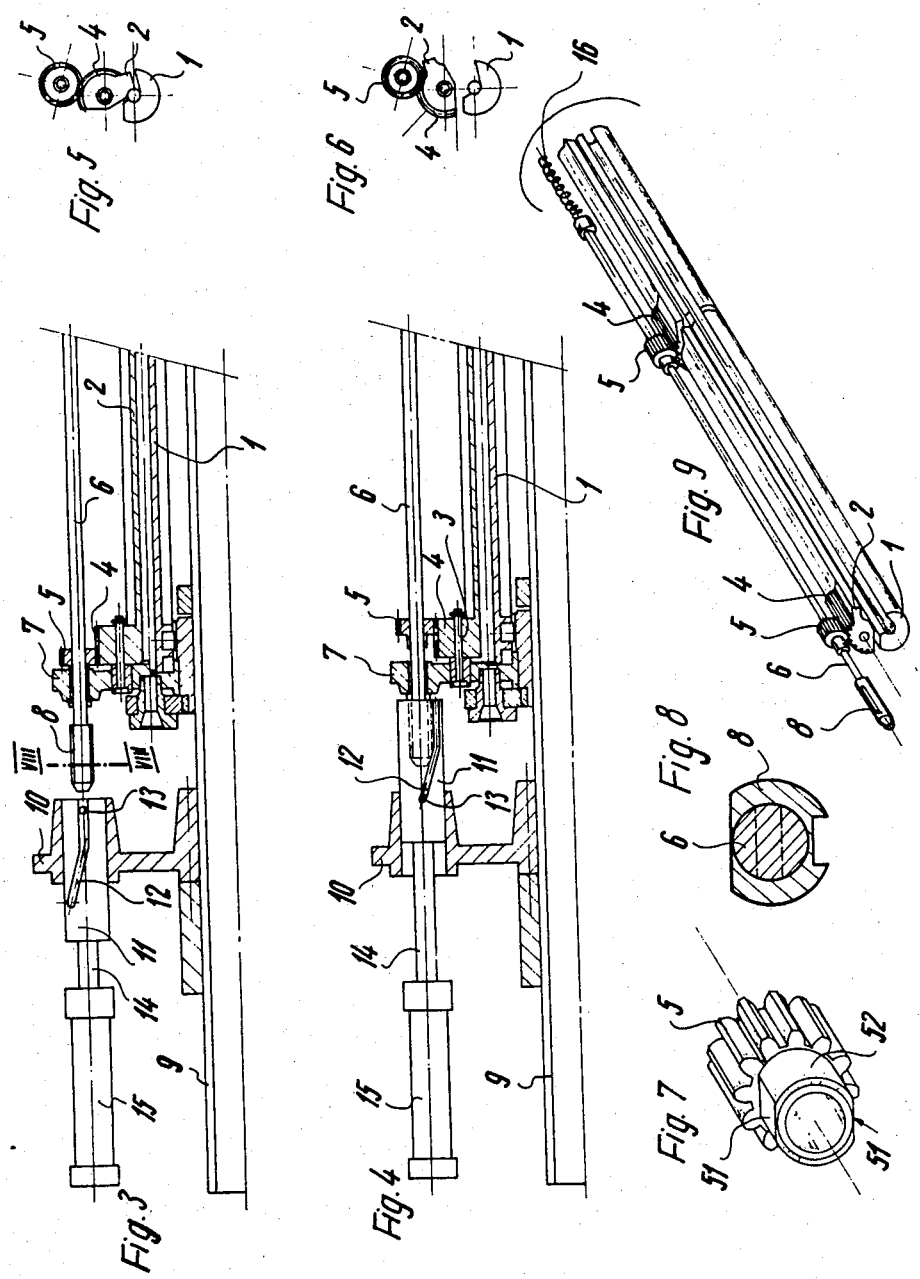

APPARATUS FOR AUTOMATICALLY OPENING AND CLOSING A BAR STOCKGUIDE TUBE FOR A MULTISPINDLE AUTOMATIC LATHE

BACKGROUND OF THE INVENTION

The invention relates generally to an apparatus for feeding bar stock to a lathe and relates particularly to such an apparatus in which a longitudinal open section of a rod guide tube can be uncovered to permit the filling of the tube with a bar from the side and in which the apparatus has a plurality of such guide tubes for feeding a multi-spindle automatic lathe.

In known bar stock feeding apparatus for multi-spindle automatic lathes the opening and closing of a cover member of the longitudinally sectioned guide tubes is done by means of a large number of parts, such as for example levers, cams, shafts, and coupling elements. The known arrangements are very expensive and in practice have shown themselves to be subject to problems. Also, the known arrangements acts only on the two end of the often rather long guide tubes, so that a complete closing of the cover members along their entire length is not assured.

It is an object of the invention to provide an apparatus of the above-described type which with relatively few parts can assure a precise and secure closing of the guide tubes along their entire length.

SUMMARY OF THE INVENTION

In the novel apparatus in accordance with the present invention a cover member disposed over the open longitudinal section of the guide tubes and which can pivot open is provided on its outer side with longitudinally spaced gear segments. Adjacent each guide tube there is mounted an actuating shaft which runs parallel to the guide tube and carries pinion gears meshing with the gear segments of the cover to pivot it into the open or closed position. The shaft is movable axially and rotatable by means of a pivot drive actuating mechanism. The rotational position of the actuating shaft can be fixed by a locking of a profiled extension of the pinion gears into a matched receiving recess in the shaft bearing support adjacent the pinion gears.

BRIEF DESCRIPTION OF THE DRAWINGS

FIG. 3 is a partially sectioned longitudinal view of a portion of the apparatus of FIG. 1, showing in greater detail a closed guide tube and an actuating mechanism associated therewith for opening and closing a cover of the tube.

FIG. 4 shows the apparatus of FIG. 1 after the actuating mechanism has opened the cover.

FIG. 5 is a cross-sectional view of the guide tube of the apparatus of FIG. 3.

FIG. 6 is a cross-sectional view of the guide tube of the apparatus of FIG. 4.

FIG. 7 is an elevated perspective view of one of the pinion gears on a shaft of the apparatus of FIGS. 1-6 by which the guide tubes are opened and closed.

FIG. 8 is a cross-sectional view of a fragment of the apparatus of FIG. 3 taken along the section line VIII—VIII.

FIG. 9 is an elevated perspective view of an open guide tube of the apparatus of FIGS. 1-6 and an actuating mechanism associated therewith for opening and closing it.

DESCRIPTION OF THE PREFERRED EMBODIMENT

Figure 1:
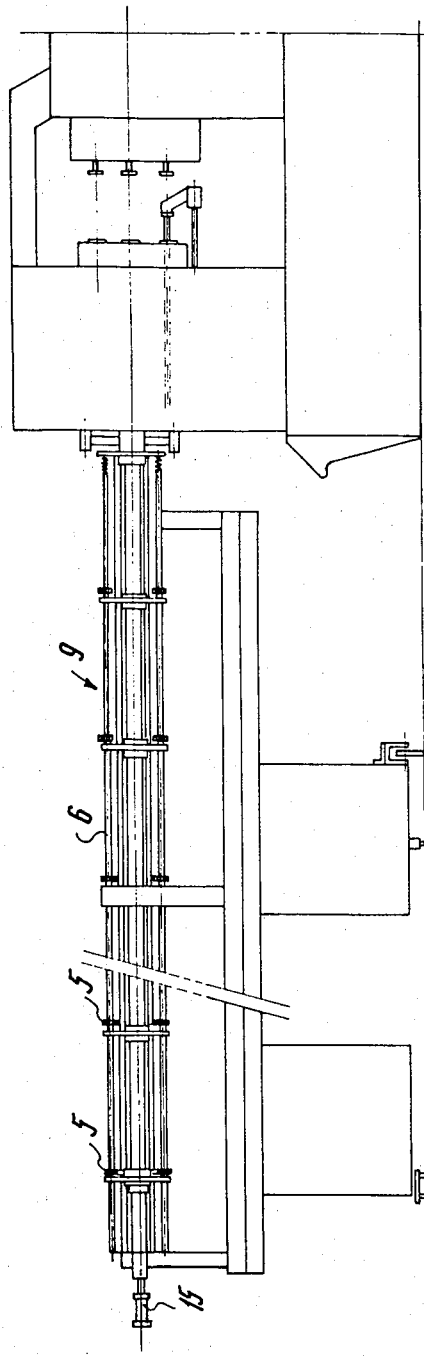
FIG. 1 is a partially sectioned schematic longitudinal side view of a bar stock feeding apparatus in accordance with a preferred embodiment of the present invention with openable guide tubes which are rotatably fixed to the spindle drum of a multi-spindle automatic lathe.
Figure 2:
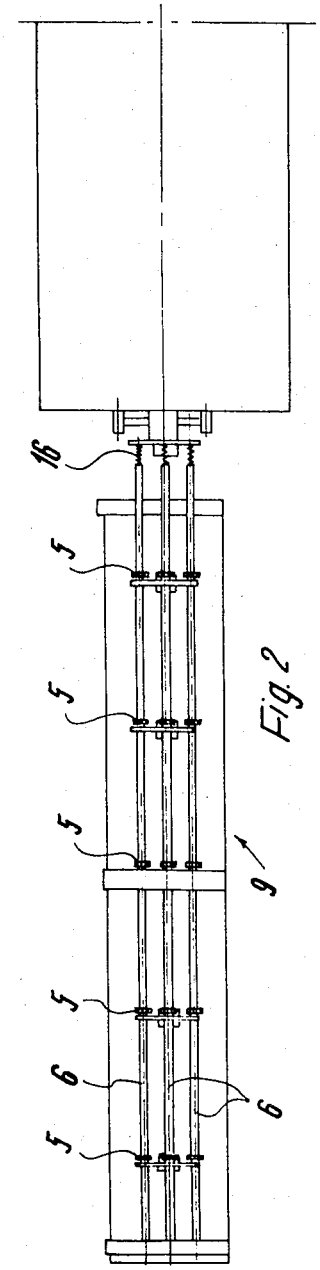
FIG. 2 is a top view of the apparatus of FIG. 1

In the FIGS. 1 and 2 of the drawings there is illustrated a rod feeding apparatus in accordance with a preferred embodiment of the invention. A number of identical rod guide tubes are mounted mutually parallel in a circle on a loading drum 9 which rotates together with the spindle drums of a multi-spindle automatic lathe. Only a part of the lathe is shown schematically. Each guide tube includes a feed channel 1 having a longitudinal section which is open and a hinged cover member 2 over the open section. The ffed channel 1 and cover 2 are fixed to the loading drum 9. The cover 2 pivots on a hinge pins 3. On the outer side of the cover there are formed gear segments 4 which preferably are evenly spaced longitudinally. The cover 2, with the gear segments 4, is preferably made as a single molded piece of synthetic resin. Each of the gear segments 4 is constantly engaged by a pinion gear mounted on an actuating shaft 6 which runs parallel to the guide tube. This shaft 6 is rotatably and slidably mounted in sleeve bearings housed in bearing supports 7 fixed to the loading drum 9 and can be axially displaced within a limited range. At its back end, i.e. remote from the spindle drum of the automatic lathe, the shaft 6 has attached to it a splined shaft stub 8, which preferably has an outer profile such as shown in FIG. 8.

When the loading drum 9 is rotated so that a particular one of the guide tubes is in the loading position, then there is located in alignment with the end of the splined stub 8 of the shaft 6 a pivot drive actuating mechanism for opening the cover 2. In the illustrated embodiment, the pivot drive has a fixed circular cylindrical coupling member 11 which can rotate and reciprocate in a sleeve bearing support housing 10. In the end of the coupling member 11, toward the splined stub 8 of the actuating shaft 6, there is a receiving passage with internal profiling matching that of the splined stub 8, for engaging it. In the wall of the circular coupling member 11 there is a cam groove 12 which near the end toward the splined stub 8 first begins parallel to the coupling member axis and then takes on a helical configuration with a stron pitch. Engaged with the cam groove 12 is a follower pin 13 which is fixed in the coupling member bearing support 10. The drive of the circular coupling member 11 results through a hydraulic piston-cylinder unit 15 connected with its piston rod 14 to the coupling member 11.

A number of pinion gears 5 fastened to the shaft 6 in engagement with the gear segments 4 of the cover 2. The pinion gears 5 are provided on their sides toward the adjacent bearing supports 7 with cylindrical locking extensions 52 having an external profile with longitudinally flat sections 51. The bearing supports 7 have on the side toward the pinion gears 5 a widening of the opening for the shaft 6 with an internal profiling matching that of the locking extensions 52, so that the extensions 52 can be received and engaged by these openings in the bearing support 7 by a longitudinal movement of the actuating shaft in a direction away from the lathe spindle to thereby fix the relative angular position of the shaft 6 and the bearing supports 7.

The pinion gears 5 are so dimensioned in their width that they are constantly in meshing engagement with the gear segments 4 in the open, as well as the closed position of the guide tube.

There is connected to each shaft 6 a prestressed helical compression spring 16 which at its other end presses against a thrust bearing, not shown, of the loading drum 9. The spring 16 gives the shaft 6 a constant axial bias away from the lathe spindle to push the locking extensions of the pinion gears 5 in the direction of engagement in the receiving openings of the bearing supports 7.

When a pressure medium is supplied to the rear pressure chamber of the piston-cylinder unit 15, the circular coupling member 11 is pushed to the right from the end position shown in FIG. 3. By this movement, the circular coupling member is brought into engagement with the splined stub 8 extending from the shaft 6. The splined stub 8 enters the receiving opening of the coupling member against the pressure of a spring (not shown) in the receiving opening. In this way, the circular coupling member 11 and the splined stub 8 become coupled rotationally.

With a further movement of the circular coupling member 11, the shaft 6 is moved axially in its bearings in the supports 7 against the action of the spring 16 so that the locking extensions 52 of the pinion gears 5, which until then were rotationally fixed in their engagement in the receiving openings of the bearing supports 7, are moved out of the bearing supports 7. Further axial movement of the coupling shaft 11 from then on forces a rotation of the coupling member 11 by the engagement of the follower pin 13 in the cam groove 12. This also rotates the shaft 6 and the pinion gears 5 fixed to the shaft 6, so that now there results a pivoting of the guide tube cover 2 to the open position (cf. FIGS. 6 and 9).

With a release of pressure in the piston-cylinder unit 15, or by changing the pressure medium supply to the forward portion of the mentioned unit, there results a reverse movement of the coupling member 11, and therewith of the shaft 6, and the pinion gears 5 fastened to it. With this reverse movement, there first occurs the closing of the guide tube cover 2. Then the locking extensions 52 of the pinion gears 5 are again brought into the receiving openings of the bearing supports 7, so that the guide tube cover 2 is locked in its closed position along its entire length. At the end of the reverse movement of the circular coupling member 11, it becomes once more disengaged from the splined stub 8 of the shaft 6, so that now the spindle drum of the lathe with the guide tubes supported on the loading drum can be pivoted into another position. In this way, there is needed only a single drive mechanism for the opening and closing of a plurality of rod guide tubes 1, 2 of a multi-spindle automatic lathe.

While the apparatus in accordance with the invention is particularly suited for a multi-spindle automatic lathe with spindles borne in a rotatable drum, it can also be used for a single spindle automatic lathe.

I claim:

1. Apparatus for automatically opening and closing a selected one of a plurality of guide tubes arranged mutually parallel on a loading drum (9) from which rod stock is fed to a lathe, each guide tube being of the type having a feed channel (1) with an open side and a cover (2) which can be pivoted over the open side to effectively close it, the improvement therein comprising:

a plurality of gear segments (4) fixed to the outer side of the cover and spaced longitudinally along it,
   an actuating shaft (6) disposed adjacent and parallel to the cover,
   a plurality of bearing supports (7) which carry the actuating shaft so that it can be rotated and moved axially to a limited extent,
   a pinion gear (5) fixed on the actuating shaft opposite each of the gear segments and constantly engaged therewith within the range of axial movement of the actuating shaft, each pinion gear being associated with one of the bearing supports,
   locking means (52) fixed to the pinion gear on the side toward the associated bearing support, so that an axial shaft movement bringing the pinion gear toward the associated bearing support moves the locking means into a matching receiving opening in the associated bearing support to lock the cover in a closed position, and
   drive means (10-15) for axially moving the shaft to unlock the cover and then rotating the shaft to open the cover.

2. The apparatus according to claim 1, wherein the gear segments are equally spaced along the cover.

3. The apparatus according to claims 1 or 2, wherein the actuating shaft is constantly axially biased by a prestressed helical compression spring which tends to move the pinion gears toward their associated bearing supports.

4. The apparatus according to claims 1, 2 or 3 and wherein said drive means is a pivot drive which is fixed in position and with which each actuating shaft can be aligned, the drive having a first, internally profiled coupling member (11) which can be moved axially toward the actuating shaft to rotatably engage a matching, second externally profiled coupling member (8) fixed to the end of the shaft.

5. The apparatus according to claim 4, wherein the pivot drive comprises an hydraulically operated piston-cylinder unit (15) having a piston rod (14) connected to a circular cylindrical coupling member which can rotate and reciprocate in a fixed support housing, the outer surface of the first coupling member having a cam groove (12) in which there is engaged a follower pin (13) fixed to the housing, the first coupling member having a receiving opening in its end with an internal profiling matching the external profiling of the second coupling member on the end of the actuating haft, so that the first coupling member can engage the second coupling member by an axial movement toward it and become rotationally fixed to it.

6. The apparatus according to claim 3, wherein the dimension of the gear segments along a direction parallel to the axis of the actuating shaft is greater than the corresponding dimension of the pinion gears by at least the magnitude of the axial movement range of the actuating shaft.

7. The apparatus according to claim 6, wherein said locking means comprises an annular locking member fixed to the pinion gear on the side toward its associated bearing support, the bearing support having an annular receiving recess facing the pinion gear for receiving the locking member when the actuating shaft is moved axially, the receiving recess and the locking member having matching profiles to fix their relative angular positions when they are engaged.

* * * * *